United States Patent
Hopper et al.

(10) Patent No.: US 6,520,722 B2
(45) Date of Patent: Feb. 18, 2003

(54) ASYMMETRICAL CUTTING TOOL TOOTH FORM

(75) Inventors: Peter B. Hopper, Lunenburg, MA (US); David Gamache, Fitchburg, MA (US)

(73) Assignee: Simonds Industries, Inc., Fitchburg, MA (US)

(*) Notice: Subject to any disclaimer, the term of this patent is extended or adjusted under 35 U.S.C. 154(b) by 0 days.

(21) Appl. No.: 09/987,805

(22) Filed: Nov. 9, 2001

(65) Prior Publication Data

US 2002/0067963 A1 Jun. 6, 2002

Related U.S. Application Data (63) Continuation of application No. 09/358,211, filed on Jul. 21, 1999, now abandoned.

(51) Int. Cl.[7] .............................. B23B 27/00; B26D 1/12
(52) U.S. Cl. .............................. 407/42; 407/43; 407/51; 83/846
(58) Field of Search .................... 407/42, 43, 30, 407/32, 51; 83/846–855, 676, 661, 835

(56) References Cited

U.S. PATENT DOCUMENTS

| | | | | |
|---|---|---|---|---|
| 3,973,455 A | * | 8/1976 | Slaats et al. | 83/56 |
| 4,827,822 A | * | 5/1989 | Yoshida et al. | 83/835 |
| 5,331,876 A | * | 7/1994 | Hayden, Sr. | 83/661 |
| 5,410,935 A | * | 5/1995 | Holston et al. | 83/851 |
| 5,425,296 A | * | 6/1995 | Kullmann et al. | 83/846 |
| 5,477,763 A | * | 12/1995 | Kullman | 83/846 |
| 5,501,129 A | * | 3/1996 | Armstrong et al. | 83/848 |
| 6,158,324 A | * | 12/2000 | Kullmann et al. | 83/848 |

OTHER PUBLICATIONS

"Machine Chatter and Vibration," Machining Data Handbook, 3rd Edition; Machinability Data Center; 1980; ISBN 0-936974-02-8; pp. 22-3 to 22-23.

* cited by examiner

*Primary Examiner*—Henry Tsai
(74) *Attorney, Agent, or Firm*—Edwards & Angell, LLP; George W. Neuner; Richard J. Roos (57) ABSTRACT

Disclosed is a cutting tool with an asymmetric tooth form, and a method for making the same. Such tooth forms are useful for cutting tools such as band saw blades, circular saws, hacksaws and other saw type products. The tooth form of this invention can improve precision over prior art tooth forms by reducing manufacturing variability. The improved precision provides more consistent performance and a better quality of the cut surface. The non-symmetrical form ground tooth profiles cut designated chip profiles and thereby cut specific portions of the kerf much like a broaching application. This non-symmetrical ground tooth profile can alter the distribution of the downfeed cutting force allowing for more aggressive cutting or conversely, cutting at the desired rate with less downfeed pressure.

15 Claims, 8 Drawing Sheets

ASYMMETRICAL CUTTING TOOL TOOTH FORM

This application is a continuation of Ser. No. 09/358,211 filed Jul. 21, 1999, now abandoned.

BACKGROUND OF THE INVENTION

1. Field of the Invention

This present invention relates to cutting blades, particularly to cutting blades having patterns of teeth formed in sequence with repeating patterns throughout the cutting blade and, more particularly, to cutting blades having carbide tips on a steel backer support.

2. Description of Related Art

Figure 1A:
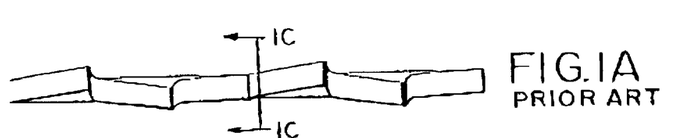
FIGS. 1A–1C illustrate a standard "set" tooth form of the prior art.
Figure 1B:
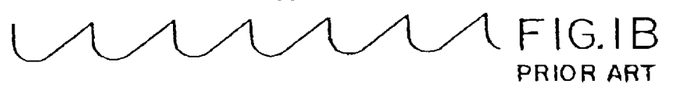
Figure 1C:
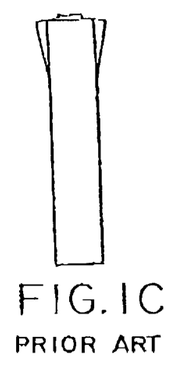

Many cutting blades rely upon setting the teeth on an angle to expose the tooth tips and allow efficient cutting (FIG. 1C). Setting the teeth also serves to cut a width (called "kerf") which is greater than the thickness of the blade and thereby allow more efficient passage of the blade body through the work. Prior art shows arrangements of these set teeth wherein the magnitude of displacement from the side of the blade varies and creates a broaching type of functionality as the kerf generated by the blade is made wider (see, U.S. Pat. No. 4,727,788 dated Mar. 1, 1988 and U.S. Pat. No. 4,813,324 dated Mar. 21, 1989). When setting the teeth of a blade, it is common to encounter variations (from the intended set) in the magnitude of set and the angle of the set tooth. These variations occur due to minor differences in position of the tooth during setting, variations present in the milling cut that generates the tooth pitch, variations in the mechanical properties of the material, variations in the geometrical characteristics of the blade, variations in the milling cutters used to generate the tooth form, or variations in the setting operation itself. This multitude of variations reduces the chance that the cutting blade will be made to the intended cutting geometry.

One method, which can reduce these variations, involves the use of grinding to generate the required tooth geometry. Grinding is used in high performance products such as a standard triple chip product (see, U.S. Pat. No. 4,011,783 dated Mar. 15, 1977) to various custom ground configurations (see, U.S. Pat. No. 5,425,296 dated Jun. 20, 1965 and U.S. Pat. No. 5,477,763). Although grinding usually increases the cost of the blade, it is effective in reducing variability. This generally increases performance consistency and precision.

A combination of grinding and setting has been used to create blades that will clear a larger kerf than would be permitted with a blade that is only form ground. This type of tooth form (see U.S. Pat. No. 5,331,876 dated Jul. 26, 1994) is still susceptible to the same types of variability mentioned above for standard set type product.

Patents pertaining to the use of grinding to create tooth forms on cutting blades generally have been restricted to creating blades which have symmetrical profiles when the cutting tooth is viewed from the front of the tooth. Exceptions to this statement occur with ground tooth forms such as those shown in U.S. Pat. No. 4,423,553 dated Jan. 3, 1984 which combines a ground or filed tooth form with setting or splaying of the teeth to create a wide cutting kerf. In some cases, this type of ground tooth has been combined with relief grinding of the blade such as is seen with standard ground relief jigsaw blades.

It can be appreciated that improvements in performance can be achieved through greater precision in the manufacture of the product. In addition, performance improvements can be obtained using arrangements of teeth, which cut preferred portions of the workpiece. Ground tooth forms that cut designated chips or areas of the kerf can provide cutting consistency and precision benefiting the end user.

PUBLICATIONS

The following patents are related to the present invention as background information. The disclosures of each are hereby incorporated herein by reference:

| | | |
|---|---|---|
| 4,011,783 | Mar. 15, 1977 | Circular Saw |
| 4,423,553 | Jan. 3, 1984 | Blade for a Saw and a Method for Manufacturing the Same |
| 4,557,172 | Dec. 10, 1985 | Saw Blade |
| 4,727,788 | Mar. 1, 1988 | Saw Blade |
| 4,813,324 | May 9, 1989 | Saw Blade |
| 4,827,822 | May 9, 1989 | Saw Blade |
| 5,331,876 | Jul. 26, 1994 | Saw Blade for Cutting Metal |
| 5,425,296 | Jun. 20, 1995 | Saw Blade |
| 5,477,763 | Dec. 26, 1995 | Saw Blade |
| 5,603,252 | Feb. 18, 1997 | Saw Blade |
| WO/98/07545 | Feb. 26, 1998 | Tooth Structure of Bandsaw Blade |

SUMMARY OF THE INVENTION

The present invention provides a cutting tool having an asymmetric ground tooth form, and a method for making the same. Such a tooth form is particularly useful for cutting tools such as band saw blades, circular saws, hacksaws and other saw type products.

In accord with the present invention, a cutting tool comprises a pattern of cutting teeth, each tooth having a carbide tip on a steel support member, the carbide tip having a side relief decreasing the width of the tip from the maximum width toward the steel support member, wherein at least one pair of teeth have an asymmetric ground tooth form that is asymmetric around a center line through a plane equally dividing a maximum width portion of the carbide tip and wherein the carbide tip of the asymmetric ground tooth form has a maximum width that is wider than a maximum width of the steel support member.

Figure 2A:
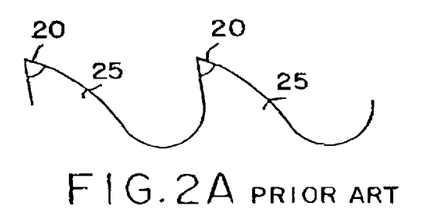
FIGS. 2A–2H illustrate a "two-tooth" pattern of the prior art.
Figure 2B:
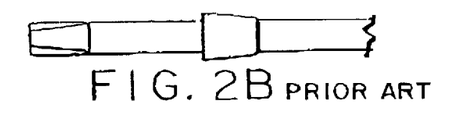
Figure 2C:
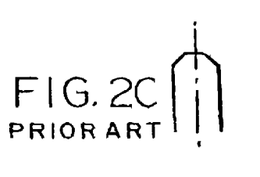
Figure 2D:
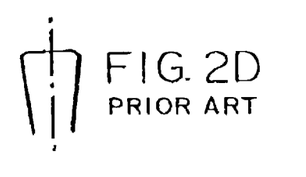
Figure 2E:
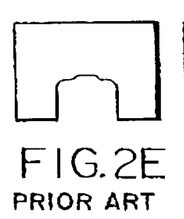
Figure 2F:
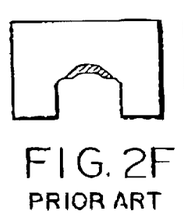
Figure 2G:
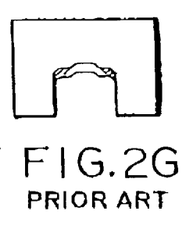
Figure 2H:
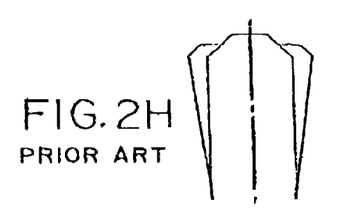
Figure 3A:
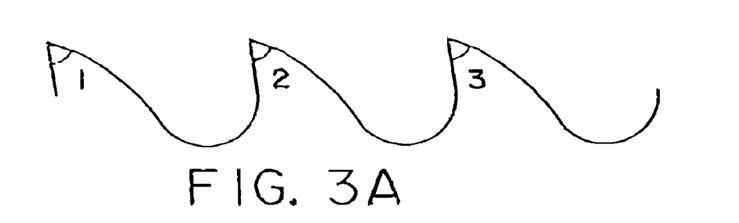
FIGS. 3A–3J illustrate a "three-tooth" pattern according to the present invention.
Figure 3B:
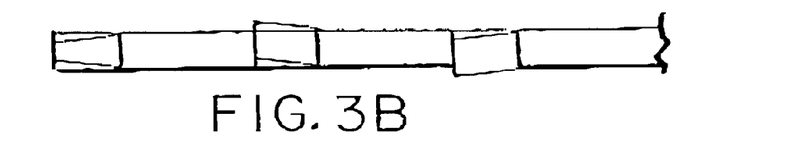
Figure 3C:
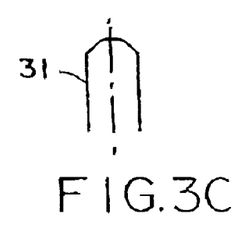
Figure 3D:
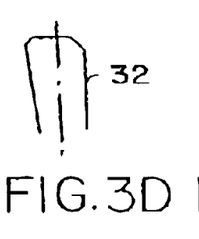
Figure 3E:
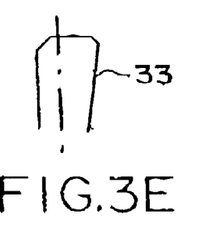
Figure 3F:
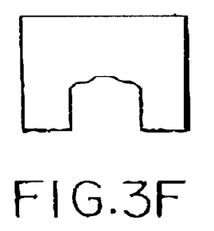
Figure 3G:
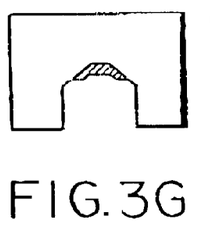
Figure 3H:
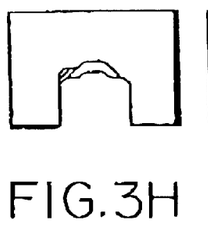
Figure 3I:
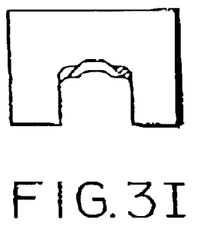
Figure 3J:
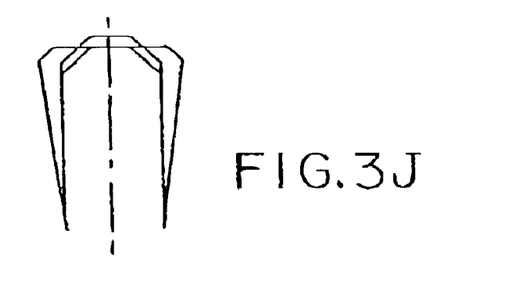

The invention relates to geometric shape of the tooth as ground (sometimes referred to herein as "tooth form"), i.e., before any setting operation. The tooth form is the cross-sectional shape of the tip of the tooth, as shown, for instance in FIGS. 2C and 2D. The tip is typically a carbide material that is welded to a steel support. The tooth form has a vertical center line (as shown) which bisects a horizontal line having a length equal to the widest dimension of the tooth form. A symmetric tooth form is symmetric about the center line. An asymmetric tooth form is not symmetric about the center line.

The pattern of tooth forms in the cutting tools of this invention offers improved precision over prior art tooth forms by reducing manufacturing variability. This improved precision can provide more consistent performance and a better quality of the cut surface. A characteristic of preferred embodiments of the present invention is a pattern of non-symmetrical form ground tooth profiles, which cut designated chip profiles and thereby cut specific portions of the kerf much like a broaching application. The non-symmetrical ground tooth profile also can alter the distribution of the downfeed cutting force allowing for more aggressive cutting or conversely, cutting at the desired rate with less downfeed pressure.

The tooth form of the present invention can be an improvement to a range of tooth forms that are made by setting teeth in the prior art forms. A preferred embodiment of the present invention provides a tooth pattern having two symmetrically form ground teeth followed by two non-symmetrically form ground teeth. The leading symmetrically form ground teeth are of differing height and width wherein the first is higher and narrower than the second. The following two non-symmetrically form ground teeth are ground so that the first of this pair cuts a chip on the left and the second cuts a chip on the right (which alternatively may be reversed). This pattern of teeth forms a series of five chips before the pattern repeats.

This invention also provides a method of grinding to generate a cutting profile which performs with greater precision than products which rely on a setting operation. Preferred embodiments of this method can offer the advantage of a better surface finish and greater control over the dimensional variations of the cutting profiles. A difference between this invention and the prior art is the generation of non-symmetrical tooth forms by grinding such that a designated edge of the tooth is assigned to cut a chip of a defined area in the cutting profile. These cutting profiles can be provided in various combinations, which can be tailored to provide the optimum cutting operations for the material being cut. Preferably, the pattern of cutting tooth forms of the present invention provides chips of material having cross sections having rectangular dimensions in the range of about 0.002 to about 0.006 inch in height and of about 0.002 to 0.010 inch in width. Harder materials may have smaller chip dimensions and softer materials may have somewhat larger chip dimensions.

Economical production of variable precision ground tooth forms was difficult with mechanically controlled tooth grinders. Recent improvements in computer controlled grinding equipment have allowed grinding a series of teeth having greatly different profiles in a single pass. Examples of equipment presently commercially available to grind a series of variable tooth forms are the UTMA AL801-B and AL804-B.

The method of the present invention also can offer the ability to manufacture product without the time or expense of a setting operation which is normally performed separate from the grinding operations. This reduces the amount of product handling and, hence, the opportunity for in-process damage to occur.

The method of the present invention also can offer the ability to generate precision tooth forms, which have better penetration rates and hence higher productivity. One reason for this improvement is the increase in the relative point loading on a tooth, which has been reduced in section. Teeth which have been ground symmetrically typically have significantly less tooth point loading than teeth which have been reduced in cross section as presented to the work.

Preferred embodiments of the method of the present invention, thus, include the generation of non-symmetrical tooth profiles through the use of grinding to generate side relief angles, top relief angles and corner chamfers or radii. Specifically, the requisite side clearance angle to permit proper cutting action is generated through precision form grinding rather than the less precise method of bending the teeth over (referred to as "setting"). Typical side relief angles for tooth forms of the present invention are from about 2 degrees to about 12 degrees off the vertical, preferably from about 3 degrees to about 6 degrees. Typical top relief angles are 0 degrees to about 12 degrees, preferably from about 3 degrees to about 6 degrees. Typical corner chamfers, when utilized, are from about 25 degrees to about 65 degrees, preferably 45 degrees. Corners can also be rounded, as desired.

The grinding also is used to generate non-symmetrical teeth which cut designated chip profiles as one of a series of broach like teeth, each tooth cutting a designated chip thereby achieving a more precise cutting action than can be obtained with a normal set type product.

A unique feature of a preferred embodiment of this invention is the use of a tooth tip, which is of greater thickness than the backer to which it is attached. The tooth tip is then form ground with a side relief to provide for superior cutting action. Previous tooth tips and the state of the art teach forming tooth tips, which begin at the same thickness as the backer and then are either (i) set to either side to create a wider kerf, or (ii) the backer is reduced in thickness to provide relief. By having a tooth tip of greater thickness than the backer, less stock removal is required to create a given amount of clearance (as related to reducing the thickness of the backer). Tip and backer material are well known to those skilled in the art of making cutter tools. For example, the backer material is typically tool steel and the tip material is typically a carbide.

One or more of these modifications can likewise be used to improve the above-described prior art tooth forms, especially those disclosed in U.S. Pat. No. 4,827,855 and WO 98/07545.

Thus, the present invention provides a method for forming non-symmetrical tooth forms which improve upon the performance of set type tooth forms. The tooth forms can include variable profiles and number of teeth to create a precision cutting form.

DETAILED DESCRIPTION OF THE INVENTION

The present invention provides cutting tools having tooth patterns utilizing a variety of asymmetric tooth forms, each of which is characterized by having a carbide tip that is wider than the steel support body of the cutting blade. These tips have been ground in such a manner as to provide clearance for passage of the blade by generating a kerf in the workpiece. Some of the tips of the teeth are ground in a manner that they are non-symmetrical and cut a specific portion of the kerf through the workpiece. The non-symmetrical ground tooth provided by the present invention also can improve the performance of the blade by changing the distribution of the downfeed cutting force.

To explain this characteristic, FIGS. 2C–2H illustrate a typical symmetrically ground tooth profile for a two tooth pattern commonly referred to as "triple chip" because it generates three cutting chips during the cutting process. If we examine this tooth profile and the kerf created by the profile, it can be seen that each pair of teeth creates a channel, first by the first higher symmetrical tooth and then on either side of the cut of the first tooth by the second symmetrically ground tooth which widens the kerf. The tooth profile is typically formed by grinding a carbide tip 20 that is carried on a steel support or body 25 (see FIG. 2A) of the cutting tool.

The downfeed force (L) is carried by the series of teeth, which are engaged in the workpiece. If a workpiece is 1 inch in diameter and there are 3 teeth per inch in the blade, then, at least two teeth are engaged with the workpiece at all times. If the downfeed pressure on the blade (L) is 100 pounds, then each tooth carries 50 pounds of downfeed force. This force can be stated in terms of pounds per linear inch of contact where the linear inch of contact is that portion of the tooth tip, which is engaged with the workpiece during the cutting process.

When dealing with symmetrically ground teeth, the linear inches in contact with the workpiece can be seen in FIG. 2 as related to the linear contact of the chip cut by tooth one and the linear contact of the chips cut by tooth two.

If teeth are ground non-symmetrically as shown in FIG. 3, the effective downfeed force per tooth in contact with the work will be increased for the constant pressure of 100 pounds. This can be seen in FIG. 3 where tooth one cuts essentially the same chip as shown in FIG. 2, but tooth two in FIG. 3 cuts exactly one half the chip shown for tooth two in FIG. 2. Because the downfeed is a constant at 100 pounds, the effective tooth load for the cutting tool of FIG. 3 is higher due to less linear contact inches. This will cause the blade to cut more aggressively for a given pressure or conversely to cut at the same rate as a blade from FIG. 2 but with less downfeed pressure. A further benefit of this improvement is the ability to increase the number of teeth in contact with the work when cutting difficult to cut materials such as austenitic stainless tubing. The increased number of teeth, while maintaining the necessary tooth point loading, allows material to be cut with less chance of tooth breaking to occur.

FIG. 3 shows one embodiment of the invention. The embodiment is similar to the standard set tooth forms illustrated in FIGS. 1 and 2. However, the improvements offered by this embodiment are increased precision for the geometry of the cutting profile. A cutting tool using the three tooth pattern illustrated in FIGS. 3C–3E has a symmetrically shaped tooth for the first tooth 31 in the pattern. The profile of this tooth is optimized to provide efficient penetration in to the workpiece and establish a stable cutting plane. In the normal set type product, as illustrated in FIG. 1, the teeth are not able to effectively establish this plane as the stabilizing unset tooth is below the plane established by the tips of the set tooth.

Following the stabilizing shaped profile of the first tooth 31 (FIG. 3C) are two teeth 32, 33 ground non-symmetrically (FIG. 3D and FIG. 3E) such that one clears the material from one side of the kerf and the second clears material from the opposite side of the kerf. This three tooth pattern is then repeated. Because the tooth forms are form ground with greater precision and accuracy than is possible with setting, improvements are obtained in the surface finish of the cut piece, the smoothness of the cutting operation and the noise generated during cutting. These benefits translate to improved efficiency of the cutting operation for the end user, and less damage to the blade during cutting.

FIGS. 3A–3J show the general tooth layout, the profiles of the various teeth, the channels or kerf cut by each tooth and the overlay showing the differing heights and widths of the teeth. It can be seen that each tooth clearly cuts a very specific portion of the workpiece or kerf.

Figure 4A:
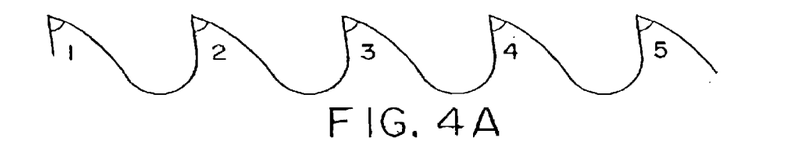
FIGS. 4A–4N illustrate a "five-tooth" pattern according to the present invention.
Figure 4B:
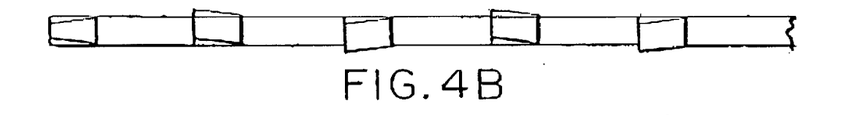
Figure 4C:
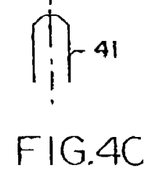
Figure 4D:
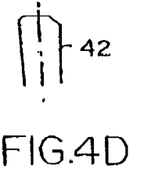
Figure 4E:
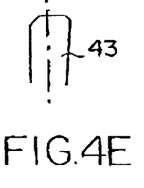
Figure 4F:
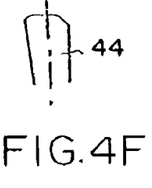
Figure 4G:
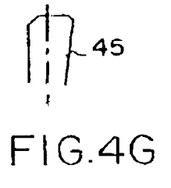
Figure 4H:
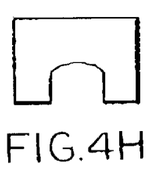
Figure 4I:
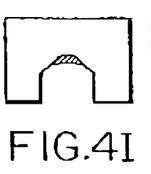
Figure 4J:
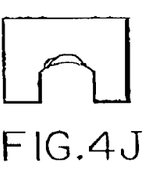
Figure 4K:
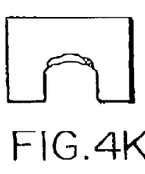
Figure 4L:
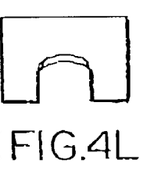
Figure 4M:
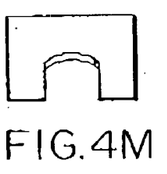
Figure 4N:
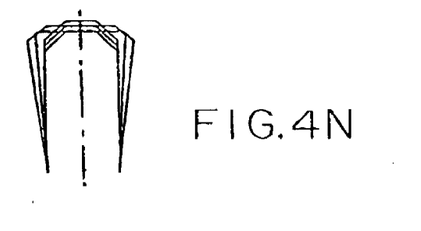
Figure 5A:
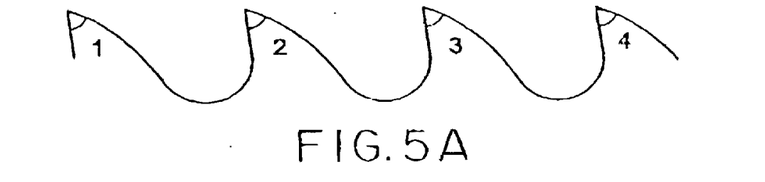
FIGS. 5A–5L illustrate a "four-tooth" pattern according to the present invention.
Figure 5B:
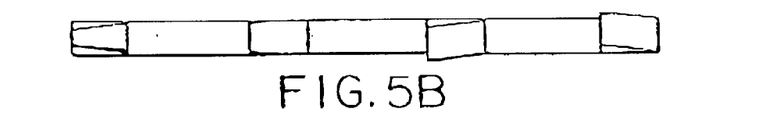
Figure 5C:
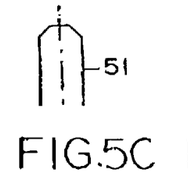
Figure 5D:
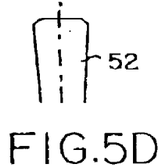
Figure 5E:
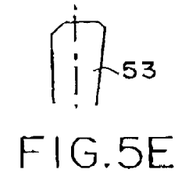
Figure 5F:
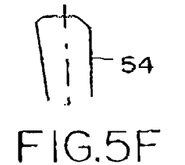
Figure 5G:
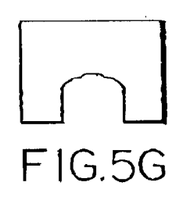
Figure 5H:
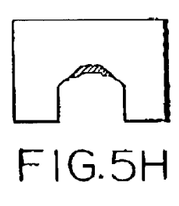
Figure 5I:
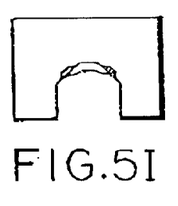
Figure 5J:
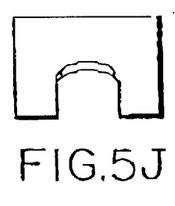
Figure 5K:
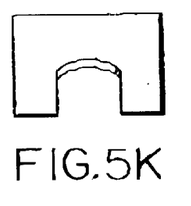
Figure 5L:
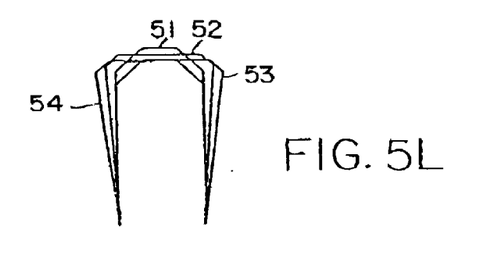

FIGS. 4A–4N show an alternative arrangement of teeth to illustrate another embodiment of the present invention, which also offers an improvement over the prior art. In this example, a single high stabilizing tooth 41 is followed by a series of four non-symmetrically ground teeth 42–45, which are generally lower in height than the initial tooth. In this embodiment, the first pair of non-symmetrically form ground teeth 42, 43 are lower and slightly wider than the first tooth 41. A second pair of asymmetric ground teeth 44, 45, which follows this first pair 42, 43, is even lower and wider than the immediately preceding pair. FIGS. 4I–4M clearly show how the initial high tooth establishes a stable penetration into the workpiece and the subsequent teeth gently enlarge the kerf to allow passage of the blade.

FIGS. 5A–5L show a preferred embodiment of the invention. This embodiment uses four teeth in the pattern. In this example, the use of two symmetrically form ground teeth 51, 52, which form a stable cutting plane, is followed by a pair of non-symmetrically form ground teeth 53, 54, which widen the kerf.

Figure 6A:
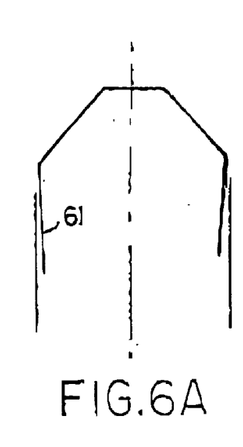
FIGS. 6A–6G illustrate a "six-tooth" pattern according to the present invention.
Figure 6B:
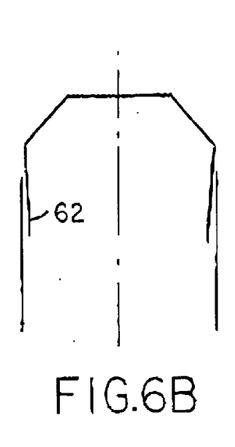
Figure 6C:
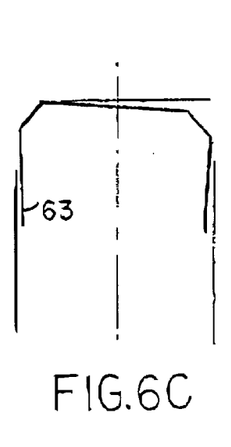
Figure 6D:
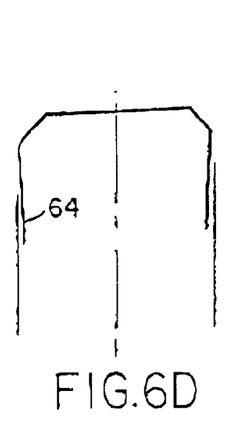
Figure 6E:
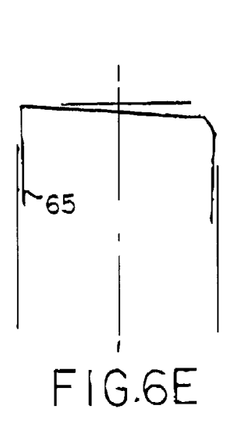
Figure 6F:
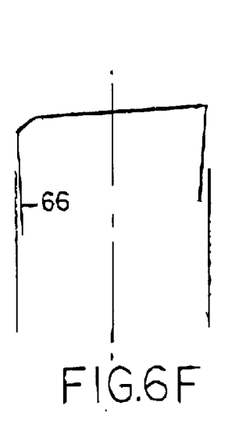
Figure 6G:
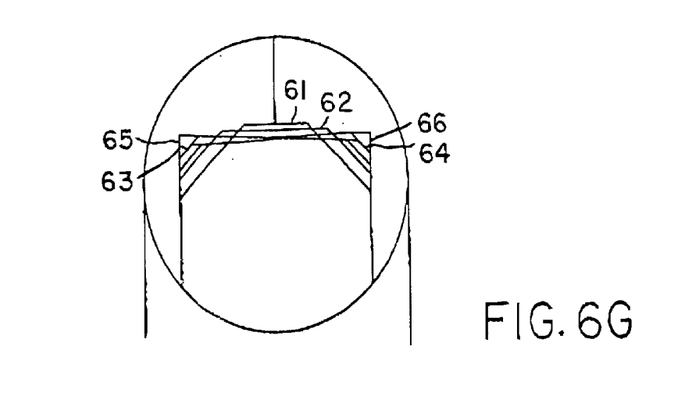

FIGS. 6A–6G show another preferred embodiment of the invention. This embodiment uses six teeth in the pattern. In this example, the use of two symmetrically form ground teeth 61, 62 form a stable cutting plane. Next, a pair of non-symmetrically form ground teeth 63, 64 widen the kerf. Then, a second pair of non-symmetrically form ground teeth 65, 66 further widen the kerf. FIG. 6G shows an overlay of all teeth in the pattern. In this embodiment, all of the teeth have a 3 degree side relief angle and both pair of non-symmetrically form ground teeth also have a 3 degree top relief angle. Also, the maximum width of each tooth is the same.

It should be noted that the asymmetric ground tooth forms in accord with the present invention are asymmetric, with or without consideration of any top relief angle that is used.

Figure 7A:
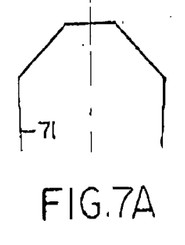
FIGS. 7A–7G illustrate an alternative "six-tooth" pattern according to the present invention.
Figure 7B:
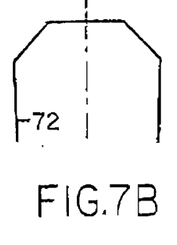
Figure 7C:
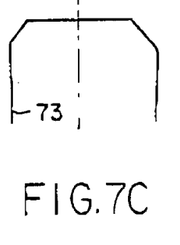
Figure 7D:
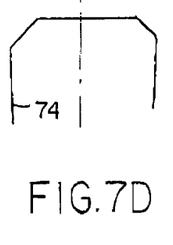
Figure 7E:
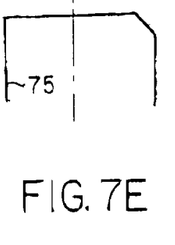
Figure 7F:
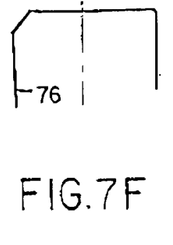
Figure 7G:
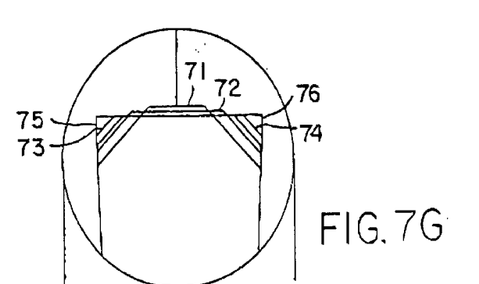

FIGS. 7A–7G show another alternative embodiment of the invention. This embodiment uses six teeth in the pattern, similar to that illustrated in FIGS. 6A–6G. In this example, the use of two symmetrically form ground teeth 71, 72 form a stable cutting plane. Next, a pair of non-symmetrically form ground teeth 73, 74 widen the kerf. Then, a second pair of non-symmetrically form ground teeth 75, 76 further widen the kerf. FIG. 7G shows an overlay of all teeth in the pattern. In this embodiment, all of the teeth have a 3 degree side relief angle, however, the top of the asymmetric teeth has no relief (i.e., the top is horizontal).

Figure 8A:
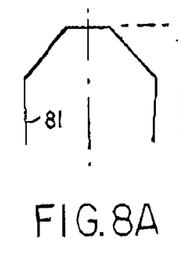
FIGS. 8A–8G illustrate an alternative "six-tooth" pattern according to the present invention.
Figure 8B:
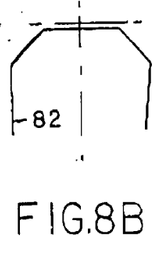
Figure 8C:
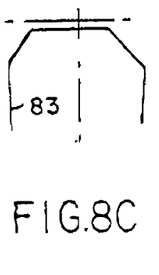
Figure 8D:
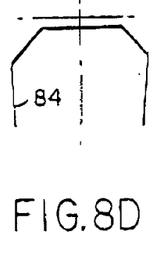
Figure 8E:
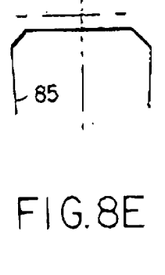
Figure 8F:
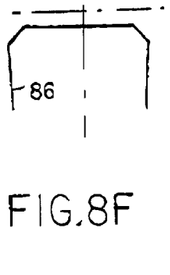
Figure 8G:
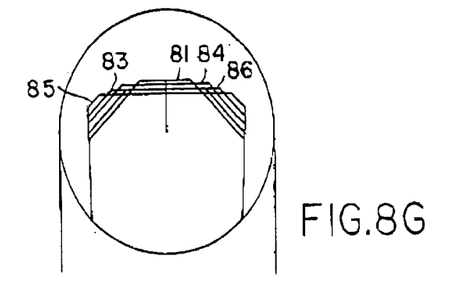

FIGS. 8A–8G show another alternative embodiment of the invention. This embodiment uses six teeth in the pattern, also similar to that illustrated in FIGS. 6A–6G. In this example, the use of two symmetrically form ground teeth 81, 82 form a stable cutting plane. Next, a pair of non-symmetrically form ground teeth 83, 84 widen the kerf. Then, a second pair of non-symmetrically form ground teeth 85, 86 further widen the kerf. FIG. 8G shows an overlay of all teeth in the pattern. In this embodiment, all of the teeth have a 3 degree side relief angle, however, the top of the asymmetric teeth has no relief (i.e., the top is horizontal). In this embodiment, the teeth have varying heights wherein the second tooth 82 is 0.002 inch shorter than the first tooth 81, the each of the first pair of asymmetric teeth 83, 84 is 0.004 inch shorter than the first tooth, and each of the second pair of asymmetric teeth 85, 86 is 0.006 inch shorter than the first tooth.

Figure 9A:
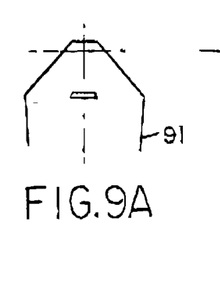
FIGS. 9A–9H illustrate a preferred "six-tooth" pattern according to the present invention.
Figure 9B:
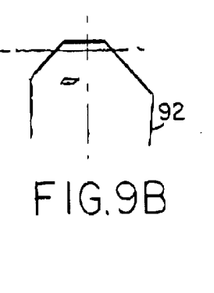
Figure 9C:
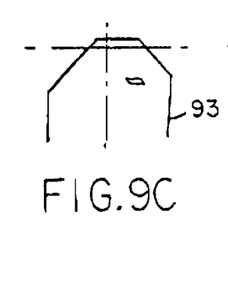
Figure 9D:
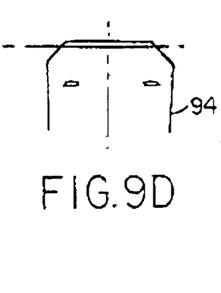
Figure 9E:
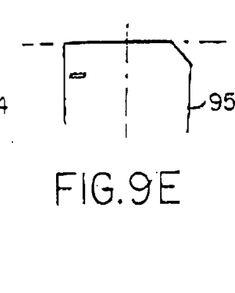
Figure 9F:
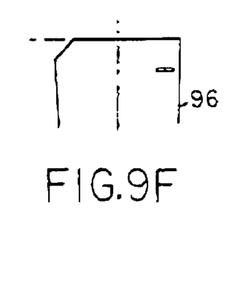
Figure 9G:
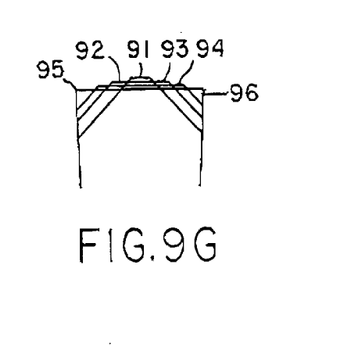
Figure 9H:
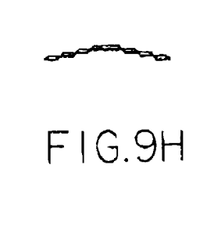
Figures 10A, 10B, 10C, 10D, 10E, 10F:
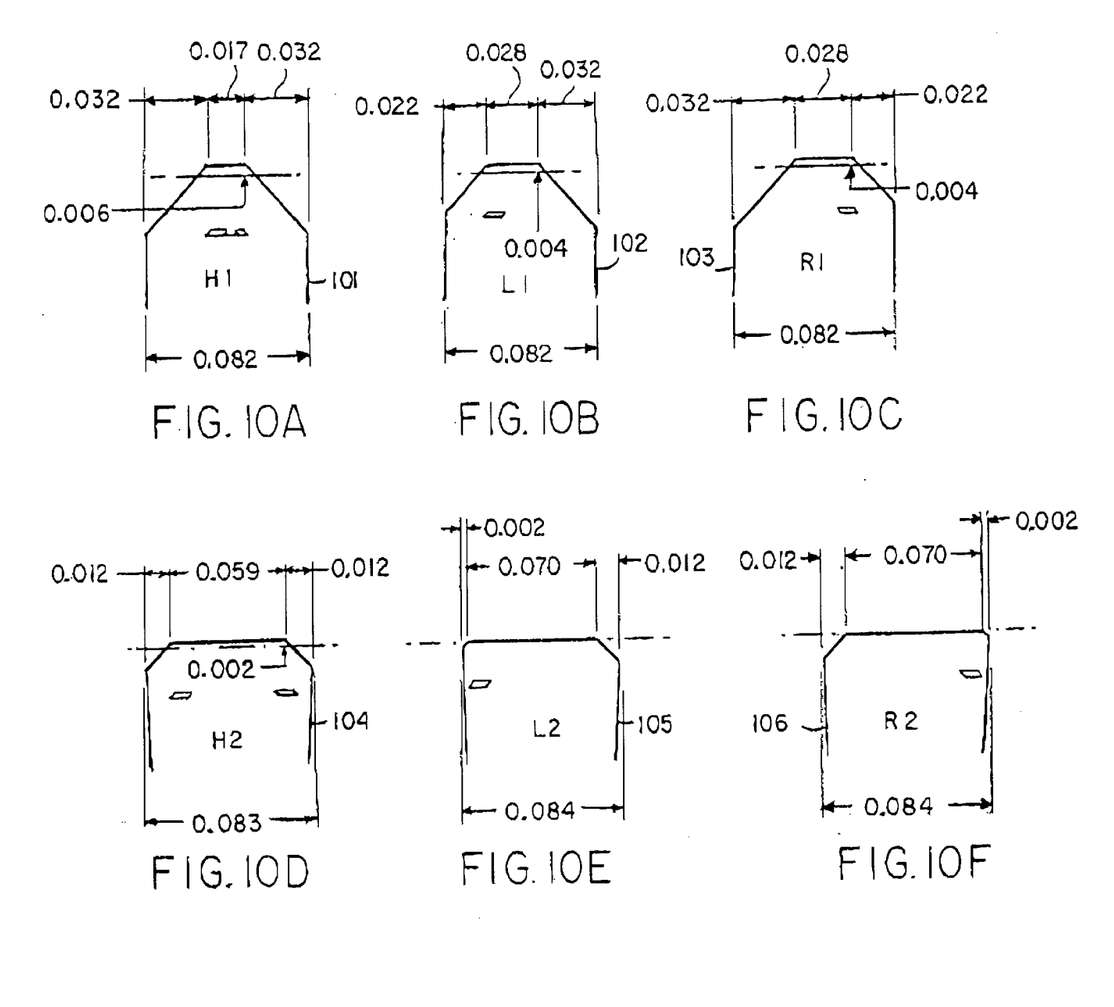
FIGS. 10A–10F illustrate another preferred "six-tooth" pattern according to the present invention.

FIGS. 9A–9H show another preferred embodiment of the invention. This embodiment uses six teeth in the pattern. In this example, a symmetrically form ground tooth 91 forms a stable cutting plane. Next, a pair of non-symmetrically form ground teeth 92, 93 widen the kerf. Then, a second symmetrical form ground tooth 94 widens the stable cutting plane. Finally, a second pair of non-symmetrically form ground teeth 95, 96 further widens the kerf. FIG. 9G shows an overlay of all teeth in the pattern. FIG. 9H illustrates the cutting chips removed by the teeth 91–96 (each individual chip is illustrated in the tooth form responsible for its cutting, see FIGS. 9A–9F). In this embodiment, all of the teeth have a 3 degree side relief angle, however, the top of the asymmetric teeth has no relief (i.e., the top is horizontal). In this embodiment, the teeth have varying heights wherein each of the first pair of asymmetric teeth 92, 93 is 0.002 inch shorter than the first tooth 91, the second symmetrical tooth 94 is 0.004 inch shorter than the first tooth, and each of the second pair of asymmetric teeth 95, 96 is 0.006 inch shorter than the first tooth.

Figure 11:
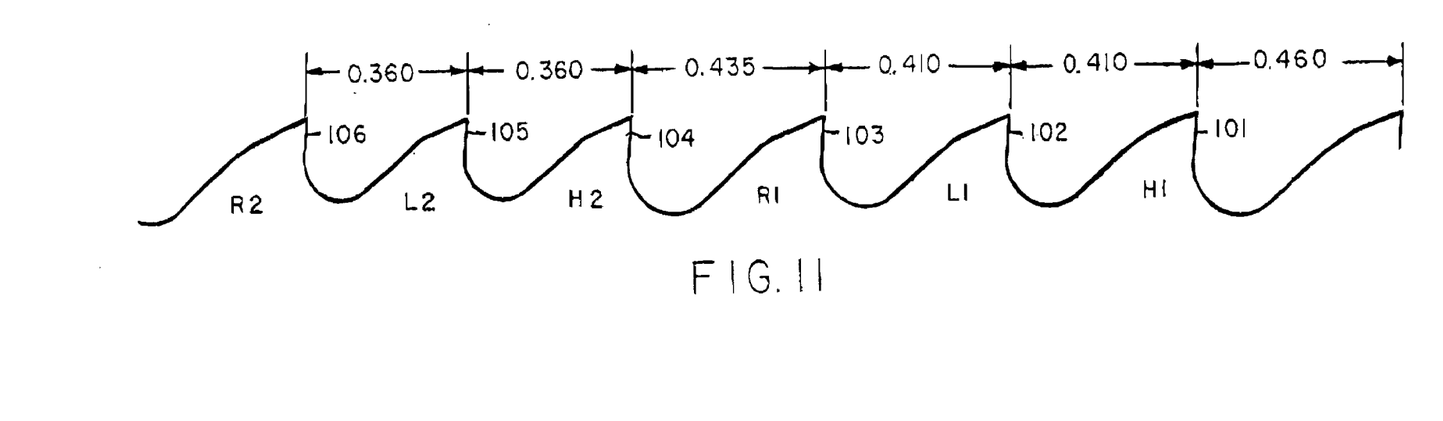
FIG. 11 illustrates a variable pitch between the teeth in the pattern illustrated in FIGS. 10A–10F.

FIGS. 10A–10F show another preferred embodiment of the invention. This embodiment uses six teeth in the pattern, similar to that illustrated in FIGS. 9A–9H. In this example, a symmetrically form ground tooth 101 forms a stable cutting plane. Next, a pair of non-symmetrically form ground teeth 102, 103 widen the kerf. Then, a second symmetrical form ground tooth 104 widens the stable cutting plane. Finally, a second pair of non-symmetrically form ground teeth 105, 106 further widens the kerf. FIG. 9G shows an overlay of all teeth in the pattern. FIG. 9H illustrates the cutting chips removed by the teeth 101–106 (each individual chip is illustrated in the tooth form responsible for its cutting, see FIGS. 10–10F). In this embodiment, all of the teeth have a 3 degree side relief angle, however, the top of the asymmetric teeth has no relief (i.e., the top is horizontal). All corner chamfers are 45 degrees. In this embodiment, the teeth have varying heights wherein each of the first pair of asymmetric teeth 102, 103 is 0.002 inch shorter than the first tooth 101, the second symmetrical tooth 104 is 0.004 inch shorter than the first tooth, and each of the second pair of asymmetric teeth 105, 106 is 0.006 inch shorter than the first tooth. Also, in this embodiment, the maximum width of the teeth in the pattern varies and the pitch between teeth varies (see FIG. 11).

It is clear that useful patterns in accord with the present invention could just as easily consist of various combinations of high teeth followed by or interspersed with non-symmetrically form ground teeth such that they cut a channel in the workpiece in a particular manner.

Thus, it can be seen that the improvements offered by non-symmetrical form grinding of tooth carbide tips which are wider than the backer steel support to which thy are attached offers significant means to improve the performance and consistency of saw products. The improvements occur through designating certain tooth tips to cut specific portions of the kerf thereby distributing the work in a manner, which allows for low stress and deflection forces. Although some variability can also occur in form grinding of tooth forms to accomplish this task, the methods used in the prior art of setting can lead to far greater variability as well as damage to the tooth tips.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A cutting tool comprising a pattern of cutting teeth, each tooth having corners, and including a carbide tip on a steel support member, the carbide tip having a maximum width and a side relief decreasing the width of the tip from the maximum width toward the steel support member, wherein the pattern of cutting teeth comprises:

a tooth having a symmetric ground tooth form, and at least one pair of teeth having an asymmetric ground, non-set tooth form that is asymmetric around a center line through a plane equally dividing a maximum width portion of the carbide tip, wherein each of the corners of at least one of the at least one pair of teeth having an asymmetric ground tooth form is chamfered, a first corner having a greater amount of chamfer than a second corner, and wherein the carbide tip of the asymmetric ground tooth form has a maximum width that is wider than a maximum width of the steel support member.

2. A cutting tool in accord with claim 1, wherein the pattern of cutting teeth comprises a first and second symmetric tooth, which are different from each other, followed by a first and second pair of teeth that have an asymmetric ground tooth form, which also are different from each other.

3. A cutting tool in accord with claim 1, wherein the pattern of cutting teeth comprises a symmetric tooth followed by a pair of teeth each having an asymmetric ground tooth form and a second symmetric tooth followed by a second pair of teeth each having an asymmetric ground tooth form, wherein the second symmetric tooth is different from the symmetric tooth and the second pair of teeth are different from the pair of teeth.

4. A cutting tool in accord with claim 1, wherein the angle of chamfer of both the first corner and the second corner is between 20 and 70 degrees.

5. A cutting tool in accord with claim 1, wherein the angle of chamfer of both the first corner and the second corner is 45 degrees.

6. A cutting tool in accord with claim 1, wherein the teeth in the pattern have varying heights and cut into a cutting material to varying depths.

7. A cutting tool in accord with claim 1, wherein each of said teeth has a side relief angle.

8. A cutting tool in accord with claim 4, wherein the side relief angle is from about 2 to about 12 degrees.

9. A method of using a cutting tool to cut an object, comprising the steps of:

providing a cutting tool having a plurality of cutting teeth that form a repeating pattern of at least three teeth, wherein each tooth has corners and includes a carbide tip on a steel support member, each carbide tip having a respective height and width, and having a center line through a plane dividing that width, and wherein at least one, but fewer than all of the cutting teeth within the repeating pattern has a ground, non-set tooth form that is symmetric with respect to the center line;

grinding at least two cutting teeth within the repeating pattern such that, following grinding, each of the ground cutting teeth has a ground tooth form that is asymmetric around the center line through the plane dividing their respective widths, and such that:

(a) at least one of the ground cutting teeth includes a first corner having a first amount of chamfering, and a second corner having a second amount of chamfering, the first amount of chamfering being greater than the second amount of chamfering, and (b) the carbide tip of each ground cutting tooth has a maximum width that is wider than a maximum width of the steel support member; and using the cutting tool to cut an object.

10. The method of claim 9, wherein at least two adjacent teeth within the repeating pattern are ground.

11. The method of claim 9, wherein at least one asymmetric tooth within the repeating pattern is ground to have an asymmetric tooth form different from at least one other asymmetric tooth within the repeating pattern.

12. The method of claim 9, wherein the repeating pattern includes a ratio of asymmetric teeth to symmetric teeth that is at least 2:1.

13. The method of claim 12, wherein the repeating pattern includes at least two symmetric teeth.

14. The method of claim 13, wherein the repeating pattern includes at least two adjacent symmetric teeth.

15. The method of claim 9, wherein the step of grinding modifies the ground tooth form by defining at least one asymmetric feature selected from the group consisting of a side relief angle, a top relief angle, and a radius.

* * * * *